United States Patent Office 2,814,625
Patented Nov. 26, 1957

2,814,625

3-INDOLYL AMINO HYDROCARBYL KETONES

Merrill E. Speeter, Kalamazoo Township, Kalamazoo County, Mich., assignor to The Upjohn Company, Kalamazoo, Mich., a corporation of Michigan No Drawing. Application April 28, 1954,
Serial No. 426,302

17 Claims. (Cl. 260—296)

The present invention relates to a novel process for the preparation of 3-(aminohydrocarbyl)-indoles and to novel compounds produced therein. More particularly, the invention is concerned with the reduction of 3-indolyl aminohydrocarbyl ketones with lithium aluminum hydride and to novel 3-indolyl aminohydrocarbyl ketones useful therein.

The term "hydrocarbyl" as used herein includes any hydrocarbon radical which connects the amino fragment of a starting 3-indolyl aminohydrocarbyl ketone to the carbonyl group which is attached to the indole nucleus at position 3, or which connects the amino fragment of a product 3-(aminohydrocarbyl)-indole to the indole nucleus at position 3.

Previous attempts have been made to reduce a 3-indolyl aminohydrocarbyl ketone but the attempts were not successful. Salway, J. Chem. Soc. 103, 351–361 (1913), attempted to reduce 3-dimethylaminoacetyl-2-methylindole with various reducing agents but had no success.

Now it has been unexpectedly found that 3-indolyl aminohydrocarbyl ketones can be readily reduced with lithium aluminum hydride. The novel process affords a much easier approach to the synthesis of 3-(aminohydrocarbyl)-indoles having branched chain or longer straight chain (i. e., a chain in excess of two carbon atoms) substituents in the three position of the indole nucleus which prior to the novel process of the present invention were extremely difficult or impossible to prepare.

Thus it is an object of the present invention to provide a novel process for the preparation of 3-(aminohydrocarbyl)-indoles. It is a further object of the present invention to provide a novel process for the preparation of 3-(aminohydrocarbyl)-indoles by reducing 3-indolyl aminohydrocarbyl ketones with lithium aluminum hydride.

In the process of the present invention the starting 3-indolyl aminohydrocarbyl ketones can, for the most part, be represented by the formula:

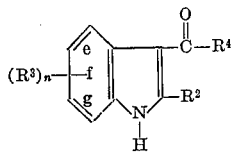

wherein $R^2$ represents hydrogen; an aryl radical, e. g., the radicals of the benzene and naphthalene series such as phenyl and naphthyl, lower-alkyl substituted phenyl and naphthyl such as tolyl, 2-methylnaphthyl, lower-alkoxy substituted phenyl and naphthyl such as methoxyphenyl, 2-ethoxynaphthyl, biphenylyl, halogen substituted phenyl and naphthyl such as chlorophenyl, 2-chloronaphthyl, and the like; an aralkyl radical, e. g., benzyl, phenethyl, halobenzyl such as para-chlorobenzyl, alkylbenzyl such as para-ethylbenzyl, alkoxybenzyl such as para-methoxybenzyl; a lower-alkyl radical containing up to and including eight carbon atoms, e. g., methyl, propyl, octyl, and the like, and advantageously contains not more than fifteen carbon atoms. $R^3$ represents halogen, e. g., chlorine, bromine, and iodine; a cyano radical: a carboxy radical; a lower-carbalkoxy radical, e. g., carbomethoxy, carbethoxy, carbobutoxy, and the like; a dialkylamino radical, e. g., dimethylamino, diethylamino, methylbutylamino, and the like; a benzyloxy radical, e. g., benzyloxy, benzhydryloxy, alkylbenzyloxy, such as para-methylbenzyloxy, para,para'-dimethylbenzhydryloxy, halobenzyloxy, such as para-chlorobenzyloxy, para,para'-dichlorobenzhydryloxy, alkoxybenzyloxy, such as para-methoxybenzyloxy, para,para'-dimethoxy-benzhydryloxy, and the like; a lower-alkoxy radical containing up to and including eight carbon atoms, e. g., methoxy, butoxy, octoxy, and the like; an acyloxy radical wherein the acyl substituent is from an organic carboxylic acid containing from one to eight carbon atoms, e. g., acetoxy, butyroxy, propionoxy, benzoxy, and the like; a lower-alkyl radical; an aralkyl radical; an aryl radical; an aryloxy radical, e. g., phenoxy, naphthoxy, and the like; a fused arylene radical, e. g., phenylene, naphthylene, and the like, and $R^3$ advantageously contains not more than fifteen carbon atoms. N is an integer from zero to four and when $n$ is more than one the $R^3$s can be alike or different. A fused arylene radical, as used herein, encompasses a divalent arylene radical which is fused at sides e, f, or g of the benzene ring of the indole nucleus. $R^4$ represents a N-heterocyclic amino radical attached at a carbon position, e. g., isoquinolyl, pyridyl, reduced isoquinolyl, and the like, and $R^4$ also represents

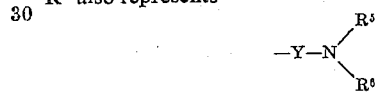

wherein Y represents an alkylene, arylene, and aralkylene radical, and advantageously contains between about four and about fifteen carbon atoms. $R^5$ and $R^6$ taken individually represent hydrogen, aryl, aralkyl, and alkyl. $R^5$ and $R^6$ taken together with —N< can also represent a heterocyclic amino radical, such as morpholinyl, piperidyl, pyrrolidyl, thiamorpholinyl, hexamethyleneimino, decahydroisoquinolyl, hexahydroisoquinolyl (both cis and trans), or the like. $R^5$ and $R^6$ advantageously contain together not more than a total of fifteen carbon atoms.

The lithium aluminum hydride reaction is advantageously carried out in the presence of a solvent such as ether, tetrahydrofuran, N-ethylmorpholine, dibutyl ether, and the like, with tetrahydrofuran ordinarily being preferred. The reduction is advantageously accomplished at the boiling point of the solvent used, although other temperatures between about zero and about 100 degrees centigrade may be employed, and preferably zero to 65 degrees centigrade. After a reaction period of from about thirty minutes to five hours the 3-(aminohydrocarbyl)-indole free bases are readily obtained as viscous oils, or in some instances in crystalline condition, by hydrolyzing the reaction mixture with aqueous ether followed by dilute alkali, decanting the solvent layer, extracting the alkaline residue with several portions of ether, combining the ether extracts and decanted solvent layer, and concentrating and evaporating the solvent. Other conventional procedures for the hydrolysis may be used if desired, and other organic solvents may be used in place of ether. The free bases thus obtained can be further purified if desired, e. g., by conventional procedures such as recrystallization, rectification, or conversion to a salt. For example, a preferable manner of procedure resides in reacting an ether extract containing the free base, without separation of the solvent, with a stoichiometric quantity of an acid, such as hydrochloric, hydrobromic, sulfuric, acetic, tartaric, citric, or the like, to form a 3-(aminohydrocarbyl)-indole acid addition salt. In this manner the free base can be separated as its crystalline salt, e. g., hydrochloride, which usually precipitates from the solution. Similarly a quaternary ammonium salt can also be prepared by reacting the tertiary amine free base with an alkyl halide or aralkyl halide and such quaternary ammonium salts include the methochloride, ethobromide, benzyl chloride, and the like. Alternatively the free base can be isolated by removal of the solvent and admixed with a stoichiometric quantity of an acid, e. g., hydrochloric, to form the corresponding acid addition salt, or the isolated tertiary amine free base can be mixed with an alkyl halide or aralkyl halide to form the quaternary ammonium salt of the 3-(aminohydrocarbyl)-indole employed. The 3-(aminohydrocarbyl)-indole salts, so obtained, can be removed by filtration and so utilized, or the resulting salt precipitate may be further purified, if desired, by recrystallizing from solvents, e. g., from alcohol-water solutions such as methanol-water, ethanol-water, and isopropanol-water. In addition to the reduction of the carbonyl group to a methylene group in the present process, other groups attached to the indole nucleus are susceptible to lithium aluminum hydride reduction. For example, a carboxy, a carbalkoxy, a cyano, or an acyloxy group as represented by $R^3$ in the above formula, are reduced to methylol, aminomethyl, and hydroxy groups, respectively.

The preparation of the 3-indolyl aminohydrocarbyl ketones employed in the novel process, except in those instances wherein $R^3$ is a cyano, carbalkoxy, carboxy, or acyloxy radical, can be readily accomplished by utilizing processes well known in the art, e. g., Salway, supra, prepared a 3-indolyl aminohydrocarbyl ketone by reacting an indole with a Grignard reagent to produce an indole Grignard reagent, and reacting the thus-produced indole Grignard reagent with a haloacyl halide to produce a 3-indolyl halohydrocarbyl ketone. In some instances in addition to the desired 3-indolyl halohydrocarbyl ketone a 1,3-bis-halohydrocarbyl product may result, but the 1-halohydrocarbyl substituent is readily cleaved to produce an additional quantity of 3-indolyl halohydrocarbyl ketone. [Saxton, J. Chem. Soc. 3592 (1952).] The 3-indolyl halohydrocarbyl ketone is thereupon reacted with ammonia, or a primary, or a secondary amine, to produce the desired 3-indolyl aminohydrocarbyl ketone. The procedure of Salway supra can be used. The process is particularly adaptable to the preparation of the secondary and tertiary aminohydrocarbyl ketones since the primary amines are susceptible to dimerization.

Since the cyano, carbalkoxy, carboxy, or acyloxy substituents are susceptible to cleavage under the drastic Grignard conditions, outlined above, the Saxton procedure, supra, can be employed to prepare these substituted indolyl halohydrocarbyl ketones, e. g., the starting indole can be dissolved in a mixture of chloroacetic anhydride and chloroacetic acid, the mixture heated to reflux, the excess anhydride removed by distillation, the residue added to water, and the resulting precipitate purified by recrystallization.

Numerous procedures are available for the preparation of the halo acyl halides employed in the present process. For example, the well known Hell-Volhard-Zelinsky reaction [Ann. Rep. Chem. Soc. (London), 1912, 83] or modifications thereof, can be employed to prepare various α-halo acyl halides. Other halides such as β or γ, etc. halo acyl halides can be prepared by halogenation of halogenated acids (Whitmore—"Organic Chemistry"—D. Van Nostrand Co., 2nd Ed. 1951, pages 273–279 and 288–289). In addition, if so desired, the process outlined in U. S. Patent 2,411,875 may be employed to prepare β-halo acyl halides. Representative halo acyl halides which can be so prepared include the following: α-haloacetyl halide (1), α-halopropionyl halide (2,10), α-halo-α-phenylacetyl halide (3), β-halomethyl-β-(α-naphthyl)-butyryl halide (4), γ-halo-β-methylprop- ionyl halide (6), β-halo-β-phenethylpropionyl halide (7), β-halo-α-benzylpropionyl halide (8), β-halo-β-phenylpropionyl halide (9), p-halobenzoyl halide (11), β-halopropionyl halide (12,16), γ-halobutyryl halide (13,17,24), β-halo-α-(α-naphthyl)-butyryl halide (14), β-halo-β-(para-chlorobenzyl)-propionyl halide (15), γ-halo-α-methyl-α-ethylbutyryl halide (18), β-halo-α-ethyl-β-benzylpropionyl halide (19), ε-halo-β-ethylhexanoyl halide (20), β-halo-α-phenylpropionyl halide (21), γ-halohexancyl halide (22), β-halomethyl-γ-phenylbutyryl halide (23), and the like.

Any of the above listed haloacyl halides can be reacted with the 3-Grignard of any of the indoles set forth below to produce a 3-indolyl halohydrocarbyl ketone, and the latter reacted with ammonia, a primary, or a secondary amine to produce the desired 3-indolyl aminohydrocarbyl ketone. The numerals which follow the compounds listed above refer to the particular example in which the starting compounds were prepared from these haloacyl halides by the prior art procedures.

It is to be understood, however, that other procedures can also be utilized for preparing the desired 3-indolyl aminohydrocarbyl ketone. For example, certain amino acyl halides, such as nicotinic acid halide, isonicotinic acid halide, isoquinaldinic acid halide, reduced isoquinaldinic acid halide, the dimethylaminobenzoyl halides, and the like, can be reacted directly with the 3-indole Grignard to give the desired 3-indolyl aminohydrocarbyl ketone. The procedure involves the preparation of the acid halide, e. g., nicotinic acid halide (25), isonicotinic acid halide (5), isoquinaldinic acid halide, reduced isoquinaldinic acid halide, p-dimethylaminobenzoyl halide, etc., by reacting the corresponding acid with thionyl halide, and thereupon reacting the acid halide with the desired 3-indole Grignard.

The various substituted indoles which are employed in the preparation of the 3-indolyl halohydrocarbyl ketones can be prepared, if so desired, by utilizing the following procedures:

(1) The 4- and 5-acyloxyindoles are prepared in the manner disclosed by Beer et al. [J. Chem. Soc. 1605–1609 (1948)] in the preparation of 4- and 5-acetoxyindoles by utilization of the corresponding acylating agent. The 6- and 7-acyloxyindoles are prepared in the same manner utilizing 4-hydroxy-2-nitrobenzaldehyde (Sachs. Ber. 39, 2758), and 3-hydroxy-2-nitrobenzaldehyde (Hodgson et al., J. Chem. Soc., 1925, 877), respectively, as the starting compounds.

(2) The starting 4-, 5-, 6- and 7-benzyloxyindoles can be prepared by the following procedure:

(a) Benzylating 3-hydroxy-2-nitrobenzaldehyde, 4-hydroxy - 2 - nitrobenzaldehyde, 5-hydroxy-2-nitrobenzaldehyde (Beer et al. supra), 6-hydroxy-2-nitrobenzaldehyde (Beer et al., supra) with a benzyl halide such as benzyl chloride, to produce the corresponding benzyloxy-2-nitrobenzaldehyde.

(b) Reacting the benzyloxy-2-nitrobenzaldehyde with a 1-nitroalkane in the presence of an alkali-metal hydroxide and at a temperature between about zero and about minus forty degrees centigrade, to produce a benzyloxy - 2 - nitro-α-[1-(1-nitroalkyl)] - benzyl alcohol-alkali salt, and thereafter acidifying the thus produced salt to yield the benzyloxy-2-nitro-α-[1-(1-nitroalkyl)]-benzyl alcohol, as more fully disclosed in U. S. Patent 2,698,345; and (c) Dehydrating the benzyloxy-2-nitro-α-[1-(1-nitroalkyl)]-benzyl alcohol by reacting the starting alcohol with an aliphatic acid anhydride at a temperature between about fifty and 150 degrees centigrade, as more fully disclosed in copending application Serial No. 273,148, filed February 23, 1952, to produce a benzyloxy-β,2-dinitrostyrene; and (d) Subjecting the benzyloxy-β,2-dinitrostyrene to reductive cyclization by reacting the styrene with powdered iron in an organic acid medium, such as acetic, propionic, butyric, or the like, at a temperature between about 50 and about 120 degrees centigrade, as more fully disclosed in copending application Serial No. 273,149, filed February 23, 1952, to produce the 7-benzyloxyindole, 6-benzyloxyindole, 4-benzyloxyindole, and 5-benzyloxyindole, respectively.

The halo, cyano, carbalkoxy, carboxy, dialkylamino, alkyl, aryl, aralkyl, and aryloxy substituted indoles employed in the present process are prepared in the same manner as the 4-, 5-, 6-, and 7-benzyloxyindoles, discussed above, except that the corresponding 2-nitrobenzaldehyde, i. e., halo-2-nitrobenzaldehyde, cyano-2-nitrobenzaldehyde, carbalkoxy-2-nitrobenzaldehyde, carboxy-2-nitrobenzaldehyde, dialkylamino-2-nitrobenzaldehyde, alkyl-2-nitrobenzaldehyde, aryl-2-nitrobenzaldehyde, aralkyl-2-nitrobenzaldehyde, and aryloxy-2-nitrobenzaldehyde are reacted with a 1-nitroalkane in place of a benzyloxy-2-nitrobenzaldehyde to produce the corresponding benzyl alcohol.

(3) The starting alkoxyindoles employed in the process of the present invention are prepared by the procedure outlined by Blaikie et al. (J. Chem. Soc. 1924, 296), in the preparation of 4-, 5-, and 7-methoxyindoles by utilizing the requisite alkoxy-2-nitrotoluene. The 6-alkoxyindoles are prepared by the procedure employed by Kermack et al. (J. Chem. Soc., 1921, 1602).

(4) The preparation of 2-substituted indoles is advantageously carried out by various procedures, e. g., the Fischer synthesis, involving phenylhydrazines and the corresponding methyl ketone, is readily applicable to the preparation of 2-substituted indoles. In Elderfield "Heterocyclic Compounds," vol. 3, page 14, 1952, John Wiley and Sons, is shown the reaction of phenylhydrazine and acetophenone to prepare 2-phenylindole. In a similar manner the 2-benzyl and 2-naphthylindoles are prepared by utilizing the corresponding phenylhydrazine and the corresponding methyl ketone. The Fischer synthesis can also be employed to prepare 2-methylindoles by reacting acetone and the corresponding phenylhydrazine.

The preparation of other 2-lower-alkylindoles is advantageously completed by the condensation of the corresponding nitrobenzaldehyde and 1-nitroalkane as more fully disclosed above and in copending application Serial No. 273,147, filed February 23, 1952.

The starting fused arylene indoles, e. g., benzindoles, are prepared by the process described by Rydon et al., J. Chem. Soc., 1951, 2462.

Representative indoles which can be utilized in the process of the present invention include the following: indoles, 5-methoxyindole, 4-acetoxyindole, 5-benzyloxyindole, 5-(para-methylbenzyloxy)-indole, 5-ethoxyindole, 6-methoxyindole, 7-methoxyindole, 5-methoxy-2-phenylindole, 5-ethoxy-2-phenylindole, 6-acetoxy-2-phenethylindole, 5-acetoxy-2-methylindole, 6-(para-chlorobenzyloxy)-indole, 7-benzhydryloxyindole, 4-(para-methoxybenzyloxy)-indole, 6-(para,para'-dimethylbenzhydryloxy)-indole, 5-benzhydryloxyindole, 6-ethoxy-2-(para-ethylbenzyl)-indole, 7-propionyloxy-2-phenethylindole, 5-butyryloxy-2-ethylindole, 6-hexanoyloxyindole, 4-benzyloxyindole, 6-benzhydryloxy-2-naphthylindole, 7-benzyloxy-2-tolylindole, 7-benzhydryloxy-2-(para-methylphenyl)-indole, 4-(para-methylbenzyloxy)-2-methylindole, 6-(para,-para'-dichlorobenzhydryloxy)-indole, 5-(para-chlorobenzyloxy) - indole, 4 - (para,para' - dimethylbenzhydryloxy)-2-(para-ethylbenzyl)-indole, 5-(para,para'-dimethoxybenzhydryloxy) - 2 - methylindole, 4 - benzyloxy - 2-ethoxyindole, 4-benzhydryloxyindole, 4-methoxyindole, 7-ethoxy-2-(para-chlorophenyl)-indole, 4-propoxy-2-(para-ethylbenzyl)-indole, 6-butoxyindole, 5-(para,para'-dichlorobenzhydryloxy)-2-(para-ethoxybenzyl) - indole, 6-hexanoyloxy-2-phenylindole, 7-octanoyloxy-2-naphthylindole, 5-benzyloxy-2-naphthylindole, 4-benzhydryloxy-2-(2-ethoxynaphthyl)-indole, 7-(para,para'-diethoxybenzhydryloxy)-2-(para-chlorobenzyl)-indole, 4 - hexoxy - 2-(para- ethoxyphenyl)-indole, 6-hexanoyloxy-2-naphthylindole, 4-octanoyloxyindole, 6-(para,para'-dibromobenzhydryloxy)-2-phenylindole, 6-propoxy-2-ethylindole, 4-methoxy-2-propylindole, 5-acetoxy-2-ethylindole, 5-ethoxy-2-(2-chloronaphthyl)-indole, 5-propionyloxy - 2 - (para - ethylbenzyl)-indole, 4-propionyloxy-2-(para-bromobenzyl)-indole, 4-acetoxy-2-phenethylindole, 4-butyryloxy-2-(para-propylphenyl)-indole, 5-propoxy-2-ethylindole, 5-butoxyindole, 6-(para,para'-dichlorobenzhydryloxy)-2-naphthylindole, 7-ethoxy-2-ethylindole, 7-butoxy-2-propylindole, 4-chloroindole, 6-carbethoxyindole, 7-cyanoindole, 5-carboxyindole, 5-cyanoindole, 6-carbomethoxyindole, 5-bromoindole, 7-bromo-2-ethylindole, 4-carbomethoxy-2-benzylindole, 7-cyano-2-tolylindole, 6-carboxy-2-(2-methylnaphthyl)-indole, 4-carbomethoxy-2-phenylindole, 6-carboxy-2-methylindole, 4-cyano-2-phenethylindole, 6-carbopropoxy-2-propylindole, 5-carbobutoxy-2-butylindole, 4-cyano-2-phenethylindole, 4-carboxy-2-phenylindole, 6-carboxyindole, 6-cyano-2-(para-methoxybenzyl)-indole, 4-carbethoxy-2-ethylindole, 5-(N,N-dimethylamino)-indole, 4-(N,N-diethylamino)-2-methylindole, 4,5-dimethoxy-2-methylindole, 5,7-dichloroindole, 4,7-dicarbethoxy-2-ethylindole, 6,7-dibenzyloxyindole, 5-benzyloxy-6-chloroindole, 5,6-dimethoxyindole, 5-bromoindole, 2-hexylindole, 4-methylindole, 5-methylindole, 6-methylindole, 7-methylindole, 2,5-dimethylindole, 5,6-dimethylindole, 2,5-diphenylindole, 2,4 - diphenylindole, 5 - benzylindole, 4-phenethylindole, 5,7-dichloro - 2 - biphenylindole, 2-t-butylindole, 2,4,7 - trimethylindole, 1-benz-(g)-indole, 1-benz-(f)-indole, 5-phenoxyindole, and the like.

Many compounds produced by the novel process of the present invention possess varied and useful pharmacological activity and others are important intermediates in the preparation of pharmacologically active compounds.

The 4-, 5-, 6-, and 7-substituted benzyloxy and alkoxy-3-(aminohydrocarbyl)-indoles produced by the process of the present invention are valuable intermediates in the preparation of hydroxy-3-(aminohydrocarbyl)-indoles including serotonin, 5-hydroxy-3-(2-aminoethyl)-indole. Serotonin was originally reported by Rapport [J. Biol. Chem. 180, 961 (1949)] and shown to possess vasoconstrictor properties. The other hydroxy-3-(aminohydrocarbyl)-indoles also possess vasoconstrictor activity. The hydroxy-3-(aminohydrocarbyl)-indoles are prepared from the 4-, 5-, 6-, or 7-benzyloxy or alkoxy substituted 3-(aminohydrocarbyl)-indoles of the present invention by debenzylation or dealkylation, respectively. The debenzylation of the benzyloxy-3-(aminohydrocarbyl)-indoles is completed by hydrogenolysis in the presence of a catalyst, e. g., palladium on charcoal, as more fully disclosed in U. S. Patent 2,708,197. The alkoxy-3-(aminohydrocarbyl)-indoles are dealkylated with aluminum chloride according to the procedure outlined by Asero et al. [Ann. 576, 69–74 (1952)]. The reduction of 4-, 5-, 6-, or 7-acyloxy-3-indolyl aminohydrocarbyl ketones according to the process of the present invention results in the reduction of the ring-attached carbonyl group and also results in the simultaneous deacylation of the indole to readily prepare pharmacologically active hydroxy-3-(aminohydrocarbyl)-indoles.

Reduction of the halo, cyano, alkyl, aryl, aralkyl, aryloxy, fused arylene, carboxy, lower-carbalkoxy, and dialkylamino substituted 3-indolyl aminohydrocarbyl ketones results in the preparation of halo, aminomethyl, alkyl, aryl, aralkyl, aryloxy, fused arylene, methylol, methylol, and dialkylamino-3-(aminohydrocarbyl)-indoles, respectively. These compounds as well as the unsubstituted 3-(aminohydrocarbyl)-indoles have diuretic, oxytocic, antioxytocic and hypnotic properties. In the case of the cyano, carboxy, and lower-carbalkoxy starting compounds simultaneous reduction of the ring-attached carbonyl group occurs along with the cyano, carboxy, and lower-carbalkoxy radicals.

The monosubstituted amino indoles, e. g., 3-[2'-(N-methylamino)-ethyl]-indole, have peculiarly enough oxytocic properties whereas the disubstituted aminoindoles, e. g., 3-[2'-(N,N-diethylamino)-ethyl]-indole, have antioxytocic properties. In addition the amines produced by the present invention have also demonstrated potent depressor activity.

The amines produced by the process of the present invention are also useful in the preparation of pickling inhibitors as more fully disclosed in U. S. Patent 2,586,331.

The following examples are illustrative of the process and products of the present invention, but are not to be construed as limiting.

*Example 1.—3-[2'-(N,N-diethylamino)-ethyl]-indole hydrochloride*

Fifteen grams of 1'-(1'-chloromethyl) 3-indolyl ketone was dissolved in 200 milliliters of benzene and to this solution was added 50 grams of diethylamine. The mixture was refluxed for thirty minutes, cooled, and the cooled mixture was extracted with dilute hydrochloric acid. On addition of base to the combined extracts a solid separated which was recrystallized from isopropanol. Sixteen grams (90 percent yield) of 1'-[1'-(N,N-diethylamino)-methyl] 3-indolyl ketone, melting at 139–141 degrees centigrade was obtained.

*Analysis.*—Calculated for $C_{14}H_{18}N_2O$: C, 73.00; H, 7.87. Found: C, 72.80; H, 7.72.

Three grams of the resulting ketone was dissolved in 100 milliliters of methyl acetate, and to this solution was added excess hydrogen chloride in isopropanol. The resulting 1'-[1'-(N,N-diethylamino)-methyl] 3-indolyl ketone hydrochloride which separated was recrystallized from isopropanol-ethyl acetate, and the compound melted at 213–215 degrees centigrade.

*Analysis.*—Calc. for $C_{14}H_{19}ClN_2O$: C, 63.49; H, 7.18; N, 10.50. Found: C, 63.63; H, 7.26; N, 10.45.

A solution of 2.3 grams of 1'-[1'-(N,N-diethylamino)-methyl] 3-indolyl ketone in 100 milliliters of tetrahydrofuran was added to 3.7 grams of lithium aluminum hydride in 200 milliliters of tetrahydrofuran. The mixture was refluxed for two hours, and the resulting mixture was diluted with ether and hydrolyzed with ten percent sodium hydroxide. The ether layer was separated, washed with water, and dried over sodium sulfate and concentrated. The resulting heavy oil was then dissolved in ether and the solution saturated with dry hydrogen chloride. The material was recrystallized from methanol-ethyl acetate and two grams of 3-[2'-(N,N-diethylamino)-ethyl]-indole hydrochloride, melting at 166–167.5 degrees centigrade, was obtained. Analytical and spectral data definitely established that the ring-attached carbonyl group was reduced to a methylene group.

*Analysis.*—Calculated for $C_{14}H_{21}ClN_2$: C, 66.53; H, 8.37; N, 11.07; Cl, 14.02. Found: C, 66.29; H, 8.47; N, 10.76; Cl, 13.81.

*Example 2.—3-[2'-(N-benzyl-N-methylamino)-propyl]-indole hydrochloride*

A Grignard reagent was prepared from 32.4 grams of methyl bromide and eight grams of magnesium in 600 milliliters of dry ether and to this Grignard was added 35.1 grams of indole. The mixture was refluxed for thirty minutes, cooled in an ice bath, stirred, and thereupon reacted with 64.5 grams of α-bromopropionyl bromide in 500 milliliters of ether. The cooled mixture was hydrolyzed by the addition of dilute acetic acid and a solid separated which was filtered, dried, twice recrystallized from benzene-methyl cyclohexane to yield 22 grams of 1'-(1'-bromoethyl) 3-[1-(α-bromopropionyl) indolyl] ketone, melting at 168–170 degrees centigrade.

*Analysis.*—Calculated for $C_{14}H_{13}Br_2NO_2$: C, 43.43; H, 3.30. Found: C, 43.68; H, 3.25.

A solution of 12.6 grams of 1'-(1'-bromoethyl) 3-[1-(α-bromopropionyl) indolyl] ketone was prepared in 200 milliliters of benzene and to this solution was added 12.1 grams of benzyl methylamine, and the mixture was then refluxed for three hours. The mixture was cooled, poured into dilute acid, and a gummy oil, insoluble in both the water and benzene layers, was formed. The oil was separated by decantation, and dilute ammonium hydroxide was added which converted the gummy oil to a solid. After three recrystallizations from isopropanol seven grams of 1'-[1'-(N-benzyl-N-methylamino)-ethyl] 3-indolyl ketone melting at 179–180 degrees centigrade was obtained. Analytical data established that the substituent in the 1 position was lost in the reaction while the bromo propionyl group in the 3 position reacted to give a benzyl amino derivative.

*Analysis.*—Calculated for $C_{19}H_{20}N_2O$: C, 78.04; H, 6.89. Found: C, 77.98; H, 6.39.

Six grams of 1'-[1'-(N-benzyl-N-methylamino)-ethyl] 3-indolyl ketone in 100 milliliters of tetrahydrofuran was added to two grams of lithium aluminum hydride dissolved in 100 milliliters of tetrahydrofuran. The mixture was concentrated to 75 milliliters, ether added, and the mixture was hydrolyzed with dilute sodium hydroxide. The ether layer was separated, dried over potassium carbonate, concentrated, and the resulting oil dissolved in a small volume of isopropanol. The crystals which separated were removed by filtration and the filtrate was concentrated to yield an oil; the oil was taken into ether and dry hydrogen chloride introduced. The gummy solid which separated was recrystallized several times from isopropanol and the compound 3-[2'-(N-benzyl-N-methylamino)-propyl]-indole hydrochloride melted at 230–232 degrees centigrade.

*Analysis.*—Calculated for $C_{19}H_{23}ClN_2$: C, 72.48; H, 7.04. Found: C, 72.46; H, 7.05.

*Example 3.—3-[2'-phenyl-2'-(N,N-diethylamino)-ethyl]-indole hydrochloride*

A mixture of 76 grams of mandelic acid and 208 grams of phosphorus pentachloride in a one-liter flask was refluxed at 120–140 degrees centigrade. The phosphorus oxychloride was distilled, the residue fractionated under reduced pressure to yield 73 grams of α-chloro-α-phenyl acetyl chloride which boiled at 68–70 degrees centigrade at 0.8 millimeter of mercury.

A solution of indole magnesium iodide was prepared through the addition of 11.7 grams of indole and 200 milliliters of ether to a solution of methyl magnesium iodide. After refluxing the Grignard solution for 45 minutes the mixture was cooled in an ice bath and nineteen grams of α-chloro-α-phenyl acetyl chloride was added whereupon a heavy gummy precipitate separated. After one hour at a temperature of about 10 degrees centigrade the mixture was hydrolyzed with ice and dilute acetic acid. The gummy precipitate dissolved and the yellow granular solid separated. The precipitate was filtered, air dried, and recrystallized three times from ethyl acetate to yield 11 grams of α-chlorobenzyl 3-indolyl ketone melting at 202–204 degrees centigrade.

*Analysis.*—Calc. for $C_{16}H_{12}ClNO$: C, 71.25; H, 4.48; N, 5.19. Found: C, 71.07; H, 4.28; N, 5.11.

In a similar manner as shown in Example 1, the α-chlorobenzyl 3-indolyl ketone was reacted with diethylamine to produce 1'-[1'-phenyl-1'-(N,N-diethylamino)-methyl] 3-indolyl ketone which was reduced with lithium aluminum hydride to yield 3-[2'-phenyl-2'-(N,N-diethylamino)-ethyl]-indole hydrochloride.

*Example 4.—5-benzhydryloxy-3-[3'-(α-naphthyl)-3'-ethyl-4'-(N,N-diethylamino)-butyl]-indole hydrochloride*

In essentially the same manner as disclosed in Example 1, 1'-[2'-(α-naphthyl)-2'-ethyl-3'-(N,N-diethylamino)-propyl] 3-(5-benzhydryloxy)-indolyl ketone is reduced with lithium aluminum hydride to produce 5-benzhydryloxy-3-[3'-(α-naphthyl)-3'-ethyl-4'-(N,N-diethylamino)-butyl]-indole hydrochloride.

In the same manner the following 3-(aminohydrocarbyl)-indoles are prepared by reducing the corresponding 3-indolyl aminohydrocarbyl ketone: 6-benzhydryloxy- 3 - [2' - (α - naphthyl) - 3' - (N - methylamino) - propyl]-indole, 4 - benzhydryloxy - 3 - [2' - (β - naphthyl) - 3'-(N - morpholino) - propyl] - indole, 6 - benzhydryloxy-3-[2'-(α-naphthyl) - 2' - (N,N - dibenzylamino) - ethyl]-indole, and the like.

*Example 5.—4-chloro-3-(γ-pyridylmethyl)-indole hydrochloride*

In essentially the same manner as disclosed in Example 1, γ-pyridyl 3-(4-chloro)-indolyl ketone is reduced with lithium aluminum hydride to produce 4-chloro - 3 - (γ-pyridylmethyl)-indole hydrochloride.

In the same maner the following 3 - (aminohydrocarbyl)-indoles are prepared by reducing the corresponding 3-indolyl aminohydrocarbyl ketone: 5-benzyloxy-3-(β - pyridylmethyl) - indole, 6-methoxy-3-(1'-isoquinolylmethyl) - indole, 5,6 - dimethoxy - 3 - [1' - (1,2,3,4-tetrahydroisoquinolyl)-methyl]-indole, and the like.

*Example 6.—2-methyl-3-[3'-methyl-4'-(N-morpholinyl)-butyl]-indole hydrochloride*

In essentially the same manner as disclosed in Example 1, 1'-[2'-methyl - 3' - (N - morpholinyl) - propyl] 3-(2-methyl)-indolyl ketone is reduced with lithium aluminum hydride to produce 2-methyl-3-[3'-methyl - 4' - (N-morpholinyl)-butyl]-indole hydrochloride.

*Example 7.—2-phenyl-3-[3'-phenethyl-3'-(N,N-dimethylamino)-propyl]-indole hydrochloride*

In essentially the same manner as disclosed in Example 1, 1'-[2'-phenethyl-2'-(N,N-dimethylamino)-ethyl] 3-(2-phenyl)-indolyl ketone is reduced with lithium aluminum hydride to produce 2-phenyl-3-[3'-phenethyl - 3' - (N,N-dimethylamino)-propyl]-indole hydrochloride.

*Example 8.—5-hydroxy - 3 - [2' - benzyl - 3' - (N-methylamino)-propyl]-indole hydrochloride*

In essentially the same manner as disclosed in Example 1, 1'-[1'-benzyl - 2' - (N - methylamino)-ethyl] 3-(5-acetoxy)-indolyl ketone is reduced with lithium aluminum hydride to produce 5-hydroxy-3-[2'-benzyl-3'-(N-methylamino)-propyl]-indole hydrochloride.

In the same manner the following 3-(aminohydrocarbyl)-indoles are prepared by reducing the corresponding 3-indolyl aminohydrocarbyl ketones: 6-hydroxy-3-[3' - phenethyl - 3' - (N,N - diphenylamino) - propyl]-indole, 5,6-dihydroxy - 3 - [2' - methyl - 3' - (N - piperidyl)-propyl]-indole, 2-ethyl - 4 - hydroxy - 3 - [3'-(N,N-dibenzylamino) - propyl] - indole, 5,6-dihydroxy - 3-[3'-phenyl - 4' - (N,N - diphenethylamino) - butyl] - indole, 5-hydroxy - 3 - [2' - (N,N-dibenzylamino) - ethyl]-indole, 5 - hydroxy - 7 - chloro - 3 - [3' - methyl - 3' - (N - ethylamino)-propyl]-indole, and the like.

*Example 9.—6-methoxy - 3 - [3'-phenyl-3'-(N-methyl-N-benzylamino)-propyl]-indole hydrochloride*

In essentially the same manner as disclosed in Example 1, 1'[2'-phenyl - 2' - (N - methyl-N-benzylamino)-ethyl] 3-(6-methoxy)-indolyl ketone is reduced with lithium aluminum hydride to produce 6-methoxy-3-[3'-phenyl-3'-(N-methyl - N - benzylamino)-propyl]-indole hydrochloride.

In the same manner the following 3 - (aminohydrocarbyl)-indoles are prepared by reducing the corresponding 3-indolyl aminohydrocarbyl ketones: 5,6-diethoxy-3-[3'-(α-naphthyl) - 3' - (N,N - dipropylamino) - propyl]-indole, 2 - (para - methylbenzyl) - 5,6 - dimethoxy - 3-(γ-pyridylmethyl) - indole, 6 - methoxy - 3 - [3' - (N-piperidyl) - propyl] - indole, 5-methoxy - 3 - (2' - aminoethyl) - indole, 6 - methoxy - 3 - [2' - (7 - hydroxy - 2-decahydroisoquinolyl)-ethyl]-indole, and the like.

*Example 10.—5-benzyloxy-3-[2'-(N,N-dibenzylamino)-propyl]-indole hydrochloride*

In essentially the same manner as disclosed in Example 1, 1'-[1'-(N,N-dibenzylamino)-ethyl] 3-(5-benzyloxy)-indolyl ketone is reduced with lithium aluminum hydride to produce 5-benzyloxy-3-[2'-(N,N-dibenzylamino)-propyl]-indole hydrochloride.

In the same manner the following 3-(aminohydrocarbyl)-indoles are prepared by reducing the corresponding 3-indolyl aminohydrocarbyl ketones: 5-(para-chlorobenzyloxy)-3-[3'-(N,N-diethylamino)-propyl]-indole, 2-phenethyl - 5 - (para - methylbenzyloxy)-3-[2'-(N-benzylamino)-ethyl]-indole, 5-(para-chlorobenzyloxy)-3-(3'-aminopropyl)-indole, 5-(para-methoxybenzyloxy)-3-[2'-methyl-4'-(N-phenethylamino)-butyl]-indole, 5-(para,para' - dimethylbenzhydryloxy)-3-(2'phenyl-2'-aminoethyl)-indole, and the like.

*Example 11.—3-[4'-(N,N-dimethylamino)-benzyl]-indole hydrochloride*

In essentially the same manner as disclosed in Example 1, 1'-[4'-(N,N-dimethylamino)-phenyl] 3-indolyl ketone is reduced with lithium aluminum hydride to produce 3-[4'-(N,N-dimethylamino)-benzyl]-indole hydrochloride.

*Example 12.—2-(para-chlorophenyl)-3-[3'-(N-ethyl-N-methylamino)-propyl]-indole hydrochloride*

In essentially the same manner as disclosed in Example 1, 1'-[2'-(N-ethyl-N-methylamino)-ethyl] 3-(2-para-chlorophenyl)-indolyl ketone is reduced with lithium aluminum hydride to produce 2-(para-chlorophenyl)-3-[3'-(N-ethyl-N-methylamino)-propyl]-indole hydrochloride.

*Example 13.—4-(N,N-dimethylamino)-3-[4'-(N-pyrrolidyl)-butyl]-indole sulfate*

In essentially the same manner as disclosed in Example 1, 1'-[3'-(N-pyrrolidyl)-propyl] 3-[4-(N,N-dimethylamino)-indolyl ketone is reduced with lithium aluminum hydride to produce 4-(N,N-dimethylamino)-3-[4'-(N-pyrrolidyl)-butyl]-indole sulfate.

*Example 14.—2-phenyl-3-[2'(α-naphthyl) - 3 - (N,N-dimethylamino)-amyl]-indole picrate*

In essentially the same manner as disclosed in Example 1, 1'-[1'-(α-naphthyl)-2'-(N,N-dimethylamino)-butyl] 3-(2-phenyl)-indolyl ketone is reduced with lithium aluminum hydride to produce 2-phenyl-3-[2'-(α-naphthyl)-3'-(N,N-dimethylamino)-amyl]-indole picrate.

*Example 15.—2 - methyl-5-methylol-3-[3'-(para-chlorobenzyl)-3'-(N-ethyl-N-benzylamino) - propyl] - indole sulfate*

In essentially the same manner as disclosed in Example 1, 1'-[2'-(para-chlorobenzyl)-2'-(N-ethyl-N-benzylamino)-ethyl] 3-(2-methyl-5-carbethoxy)-indolyl ketone is reduced with lithium aluminum hydride to produce 2-methyl-5-methylol-3-[3'-(para-chlorobenzyl)-3'-(N-ethyl-N-benzylamino)-propyl]-indole sulfate.

*Example 16.—5-methylol-3-[3'-(N-benzyl-N-phenylamino)-propyl]-indole tartrate*

In essentially the same manner as disclosed in Example 1, 1'-[2'-(N-benzyl-N-phenylamino)-ethyl] 3-(5-carboxy)-indolyl ketone is reduced with lithium aluminum hydride to produce 5-methylol-3-[3'-(N-benzyl-N-phenylamino)-propyl]-indole tartrate.

*Example 17.—6-aminomethyl-3-[4'-(N,N-dimethylamino)-butyl]-indole hydrochloride*

In essentially the same manner as disclosed in Example 1, 1'-[3'-(N,N-dimethylamino)-propyl] 3-(6-cyano)-indolyl ketone is reduced with lithium aluminum hydride to produce 6-aminomethyl-3-[4'-(N,N-dimethylamino)-butyl]-indole hydrochloride.

*Example 18.—5-(para-chlorobenzyloxy)-3-[2'-ethyl-2'-methyl-4'-(N-benzyl-N-methylamino)-butyl]-indole hydrochloride*

In essentially the same manner as disclosed in Example 1, 1'-[1'-ethyl-1'-methyl-3'-(N-benzyl-N-methylamino)-propyl] 3-(5-para-chlorobenzyloxy)-indolyl ketone is reduced with lithium aluminum hydride to produce 5-(para-chlorobenzyloxy) - 3 - [2'-ethyl - 2' - methyl-4'-(N-benzyl-N-methylamino)-butyl]-indole hydrochloride.

*Example 19.—2-benzyl-3-[2'-ethyl-3'-benzyl-3'-(N,N-dibenzylamino)-propyl]-indole picrate*

In essentially the same manner as disclosed in Example 1, 1'-[1'-ethyl-2'-benzyl-2'-(N,N-dibenzylamino)-ethyl] 3-(2-benzyl)-indolyl ketone is reduced with lithium aluminum hydride to produce 2-benzyl-3-[2'-ethyl-3'-benzyl-3'-(N,N-dibenzylamino)-propyl]-indole picrate.

*Example 20.—5-methyl-3-(3'ethyl-6'-(N,N-dimethylamino)-hexyl] indole hydrochloride*

In essentially the same manner as disclosed in Example 1, 1'-[2'-ethyl-5'-(N,N-dimethylamino)-amyl] 3-(5-methyl)-indolyl ketone is reduced with lithium aluminum hydride to produce 5-methyl-3-(3'-ethyl-6'-(N,N-dimethylamino)-hexyl]-indole hydrochloride.

In the same manner the following 3-(aminohydrocarbyl)-indoles are prepared by reducing the corresponding 3-indolyl aminohydrocarbyl ketone with lithium aluminum hydride: 4-methyl-3-[2'-(α-naphthyl)-4'-(N,N-diphenethylamino)-butyl]-indole, 2,5-dimethyl-3-[5'-(N-morpholinyl)-amyl]-indole, 5,6-dimethyl-3-[3'-(N,N-dimethylamino)-propyl]-indole, 4-methyl-3-(2'-aminoethyl)-indole, 6-propyl-3-[2'-(N-pyrrolidyl)-ethyl]-indole, and the like.

*Example 21.—2,5-diphenyl-3-[2'-phenyl-3'-(N,N-diphenylamino)-propyl]-indole hydrochloride*

In essentially the same manner as disclosed in Example 1, 1'-[1'-phenyl-2'-(N,N-diphenylamino)-ethyl 3-(2,5-diphenyl)-indolyl ketone is reduced with lithium aluminum hydride to produce 2,5-diphenyl-3-[2'-phenyl-3'-(N,N-diphenylamino)-propyl]-indole hydrochloride.

In the same manner the following 3-(aminohydrocarbyl)-indoles are prepared by reducing the corresponding 3-indolyl aminohydrocarbyl ketone with lithium aluminum hydride: 4-phenyl-3-[5'-(N-piperidyl)-amyl]-indole, 7-naphthyl-3-[2'-(α-naphthyl)-3'-(N,N - diphenylamino)-propyl]-indole, 5,7-diphenyl-3-[4'-(N-hexamethyleneimino)-butyl]-indole, and the like.

*Example 22.—6-benzyl-3-[4'-ethyl-4'-(N,N-dibenzylamino)-butyl]-indole hydrochloride*

In essentially the same manner as disclosed in Example 1, 1'-[3'-ethyl-3'-(N,N-dibenzylamino)-propyl] 3-(6-benzyl)-indolyl ketone is reduced with lithium aluminum hydride to produce 6-benzyl-3-[4'-ethyl-4'-(N,N-dibenzylamino)-butyl-indole hydrochloride.

In the same manner the following 3-(aminohydrocarbyl)-indoles are prepared by reducing the corresponding 3-indolyl aminohydrocarbyl ketone with lithium aluminum hydride: 4,6-dibenzyl-3-[5'-benzyl-6'-(N,N-dibenzylamino)-hexyl]-indole, 4-phenethyl-3-(γ-pyridylmethyl)-indole, 5-phenylpropyl-3-[3'-(N-hexamethyleneimino)-propyl]-indole, and the like.

*Example 23.—5 - phenoxy - 3 - [2' - phenethyl - 3' - (N-phenyl-N-ethylamino)propyl]-indole picrate*

In essentially the same manner as disclosed in Example 1, 1' - [1' - phenethyl - 2' - (N - phenyl - N - ethylamino)-ethyl] 3 - (5 - phenoxy)indolyl ketone is reduced with lithium aluminum hydride to produce 5-phenoxy-3-[2'-phenethyl - 3' - (N - phenyl - N - ethylamino)propyl]-indole picrate.

In the same manner the following 3-(aminohydrocarbyl)-indoles are prepared by reducing the corresponding 3-indolyl aminohydrocarbyl ketone with lithium aluminum hydride: 5,7 - diphenoxy - 3 - [3' - (N - piperidyl)-propyl] - indole, 6 - naphthoxy - 3 - [4' - naphthyl - 5'-(N,N - diphenyl) - amyl] - indole, 4,6 - diphenoxy - 3-[3' - (N - hexamethyleneimino) - propyl] - indole, 4,5-diphenoxy - 3 - (2' - aminoethyl) - indole, and the like.

*Example 24.—1 - benz - (g) - 3 - ]4' - (N,N - dibutylamino) - butyl] - indole hydrochloride*

In essentially the same manner as disclosed in Example 1,1' - [3' - (N,N - dibutylamino) - propyl] 3 - [1 - benz-(g)] - indolyl ketone is reduced with lithium aluminum hydride to produce 1 - benz - (g) - 3 - [4' - (N,N - dibutylamino) - butyl] - indole hydrochloride.

In the same manner the following 3 - (aminohydrocarbyl) - indoles are prepared by reducing the corresponding 3 - indolyl aminohydrocarbyl ketone with lithium aluminum hydride: 1 - benz - (e) - 3 - [3' - (N,N - dibenzylamino) - propyl] - indole, 1 - benz - (f) - 3 - [4'-(N - hexamethyleneimino) - butyl] - indole, and the like.

*Example 25.—3 - (β - pyridylmethyl) - indole hydrochloride*

One-tenth mole of an indole Grignard reagent was prepared in the same manner as disclosed in Example 2, and after the indole Grignard reactant was cooled in an ice-salt bath, 17.8 grams (0.1 mole) of nicotinyl chloride hydrochloride was added. After stirring for several hours in an ice-bath the mixture was allowed to stand for about eight hours. The reaction mixture was hydrolyzed with ice and acetic acid, and a small amount of crystalline product thereupon separated. After several recrystallizations from isopropanol, the product, β-pyridyl 3-indolyl ketone melted at 210–211 degrees centigrade.

*Analysis.*—Calc. for $C_{14}H_{10}N_2O$: C, 75.67; H, 4.53; N, 12.60. Found: C, 75.61; H, 4.48; N, 12.66.

In the same manner as disclosed in Example 1, β-pyridyl 3-indolyl ketone is reduced with lithium aluminum hydride to produce 3-(β-pyridylmethyl)-indole hydrochloride.

The 3-indolyl aminohydrocarbyl ketones, wherein the amino radical is a N-heterocyclic amino group, e. g., isoquinolyl or tetrahydroisoquinolyl, and is attached to the keto group at a carbon position, can be prepared in the manner outlined in the above example.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. In a process for the preparation of 3-(aminohydrocarbyl)-indoles including acid addition salts thereof, the step of reducing with lithium aluminum hydride a 3-indolyl aminohydrocarbyl ketone having the formula:

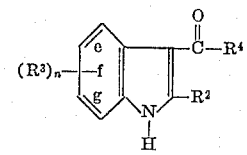

wherein $R^2$ is selected from the group consisting of hydrogen, aryl, aralkyl, and lower-alkyl, $n$ is an integer from zero to four, $R^3$ is selected from the group consisting of carboxy, cyano, lower-carbalkoxy, halogen, a dialkylamino, a lower-alkyl, an aryl, an aralkyl, an aryloxy, a lower-alkoxy, a benzyloxy, an acyloxy radical wherein the acyl substituent is from an organic carboxylic acid, and a fused arylene radical, and $R^4$ is selected from the group consisting of an N-heterocyclic amine attached at a carbon position, and

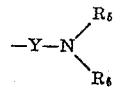

wherein Y is selected from the group consisting of alkylene, arylene, and aralkylene radicals, and $R^5$ and $R^6$ are selected from the group consisting of hydrogen, aryl, aralkyl, and alkyl, and additional members of this series wherein $R^5$ and $R^6$ together with —N< form a heterocyclic amino radical.

2. In a process for the preparation of 3-(aminohydrocarbyl)-indoles including acid addition salts thereof, the steps of converting an indole having the formula:

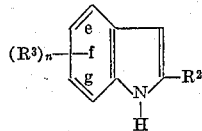

wherein $R^2$ is selected from the group consisting of hydrogen, aryl, aralkyl, and lower-alkyl, $n$ is an integer from zero to four, and $R^3$ is selected from the group consisting of carboxy, cyano, lower-carbalkoxy, halogen, a dialkylamino, a lower-alkyl, an aryl, an aralkyl, an aryloxy, a lower-alkoxy, a benzyloxy, an acyloxy radical wherein the acyl substituent is from an organic carboxylic acid, and a fused arylene radical, to a 3-indolyl aminohydrocarbyl ketone having the formula:

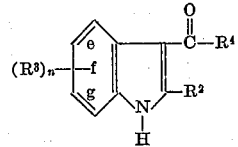

wherein $R^2$, $R^3$, and $n$ have the same values as represented above, and $R^4$ is selected from the group consisting of an N-heterocyclic amine attached at a carbon position, and

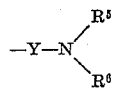

wherein Y is selected from the group consisting of alkylene, arylene, and aralkylene radicals, and $R^5$ and $R^6$ are selected from the group consisting of hydrogen, aryl, aralkyl, and alkyl, and additional members of this series wherein $R^5$ and $R^6$ together with —N< form a heterocyclic amino radical, and reducing the 3-indolyl aminohydrocarbyl ketone with lithium aluminum hydride to prepare a 3-(aminohydrocarbyl)-indole.

3. In a process for the preparation of 3-(aminohydrocarbyl)-indoles including acid addition salts thereof, the steps of reacting a Grignard reagent with an indole having the formula:

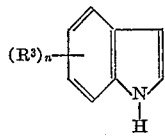

wherein $R^3$ is a benzyloxy radical, and $n$ is an integer from one to four, to produce an indole Grignard reagent, mixing a halo acyl halide with the thus-produced indole Grignard reagent, reacting the 3-indolyl halohydrocarbyl ketone compound thus-produced with a diaralkylamine to prepare a 3-indolyl aminohydrocarbyl ketone having the formula:

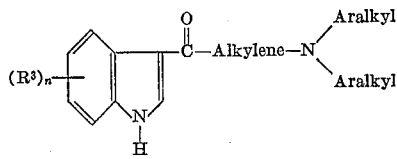

wherein $R^3$ and $n$ have the same values as represent above, and reducing the 3-indolyl aminohydrocarbyl ketone with lithium aluminum hydride to prepare a 3-(aminohydrocarbyl)-indole.

4. In a process for the preparation of 3-(aminohydrocarbyl)-indoles including acid addition salts thereof, the step of reducing with lithium aluminum hydride a 3-indolyl aminohydrocarbyl ketone having the formula:

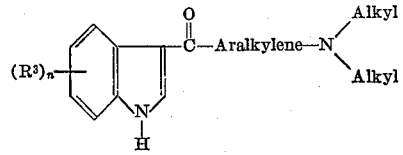

wherein $R^3$ is a lower-alkoxy radical, and $n$ is an integer from one to four.

5. In a process for the preparation of 3-(aminohydrocarbyl)-indoles including acid addition salts thereof, the step of reducing with lithium aluminum hydride a 3-indolyl aminohydrocarbyl ketone having the formula:

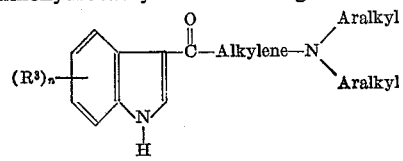

wherein $R^3$ is a benzyloxy radical, and $n$ is an integer from one to four.

6. In a process for the preparation of 3-(aminohydrocarbyl)-indoles including acid addition salts thereof, the step of reducing with lithium aluminum hydride a 3-indolyl aminohydrocarbyl ketone having the formula:

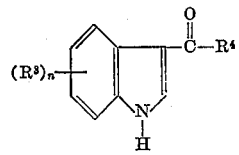

wherein $R^3$ is an acyloxy radical, $n$ is an integer from one to four, and $R_4$ is an N-heterocyclic amine attached at a carbon position.

7. In a process for the preparation of 3-(aminohydrocarbyl)-indoles including acid addition salts thereof, the step of reducing with lithium aluminum hydride a 3-indolyl aminohydrocarbyl ketone having the formula:

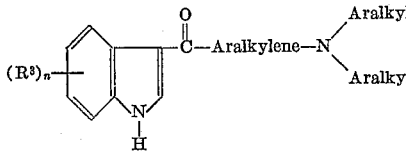

wherein $R^3$ is a lower-alkoxy radical, and $n$ is an integer from one to four.

8. In a process for the preparation of 3-(aminohydrocarbyl)-indoles including acid addition salts thereof, the step of reducing with lithium aluminum hydride a 3-indolyl aminohydrocarbyl ketone having the formula:

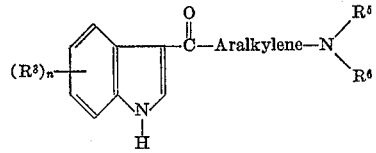

wherein $R^3$ is a benzyloxy radical, $n$ is an integer from one to four, and $R^5$ and $R^6$ together with —N< form a heterocyclic amino radical.

9. In a process for the preparation of 6-methoxy-3-[3' - phenyl - 3' - (N - methyl - N - benzylamino)-propyl]-indole including acid addition salts thereof, the step of reducing 1'-[2'-phenyl-2'(N-methyl-N-benzylamino)-ethyl] 3-(6-methoxy)-indolyl ketone with lithium aluminum hydride.

10. In a process for the preparation of 3-[2'-(N,N-diethylamino)-ethyl]-indole including acid addition salts thereof, the step of reducing 1'-[1'-(N,N-diethylamino)-methyl] 3-indolyl ketone with lithium aluminum hydride.

11. In a process for the preparation of 5-benzyloxy-3-[2'-(N,N-dibenzylamino)-propyl]-indole including acid addition salts thereof, the step of reducing 1'-[1'-(N,N - dibenzylamino) - ethyl] 3 - (5 - benzyloxy)-indolyl ketone with lithium aluminum hydride.

12. In a process for the preparation of 3-[2'-phenyl-2'-(N,N - diethylamino) - ethyl] - indole including acid addition salts thereof, the step of reducing 1'-[1'-phenyl-1' - (N,N - diethylamino) - methyl] 3 - indolyl ketone with lithium aluminum hydride.

13. In a process for the preparation of 3-[2'-(N-benzyl-N-methylamino)-propyl]-indole including acid addition salts thereof, the step of reducing 1'-[1'-(N-benzyl-N-methylamino)-ethyl] 3-indolyl ketone with lithium aluminum hydride.

14. A 3-indolyl aminohydrocarbyl ketone having the formula:

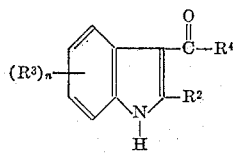

wherein $R^2$ is a radical containing not more than fifteen carbon atoms and is selected from the group consisting of hydrogen, aryl, aralkyl, and lower-alkyl, $n$ is an integer from one to four, $R^3$ is a radical containing not more than fifteen carbon atoms and is selected from the group consisting of carboxy, cyano, lower-carbalkoxy, halogen, a dialkylamino, an aryl, an aralkyl, an aryloxy, a lower-alkoxy, a benzyloxy, an acyloxy radical wherein the acyl substituent is from a hydrocarbon-carboxylic acid containing from one to eight carbon atoms, inclusive, and a fused arylene radical, and $R^4$ is selected from the group consisting of a N-heterocyclic amine attached at a carbon position, and

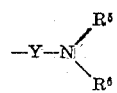

wherein Y is selected from the group consisting of alkylene, arylene, and aralkylene radicals containing not more than 15 carbon atoms, and $R^5$ and $R^6$ which together contain not more than 15 carbon atoms are selected from the group consisting of hydrogen, aryl, aralkyl, and alkyl, and additional members of this series wherein $R^5$ and $R^6$ together with —N< form a heterocyclic amino radical.

15. 1' - [1' - (N - benzyl - N - methylamino) - ethyl] 3-indolyl ketone.

16. 1' - [1' - phenyl - 1' - (N,N - diethylamino) - methyl] 3-indolyl ketone.

17. β-pyridyl 3-indolyl ketone.

References Cited in the file of this patent
UNITED STATES PATENTS

| | | |
|---|---|---|
| 1,793,176 | Klarer et al. | Feb. 17, 1931 |
| 2,315,661 | Salzer et al. | Apr. 6, 1943 |
| 2,416,258 | Jenkins et al. | Feb. 18, 1947 |
| 2,692,882 | Speeter | Oct. 26, 1954 |

OTHER REFERENCES

Jr. Org. Chem., vol. 16, page 807 (1951).
Jr. Org. Chem., vol. 18, pages 508 and 509 (1953).
Jr. Biol. Chem., vol. 180, page 967 (1949).
Jr. Am. Pharm. Assoc., vol. 32, page 84 (1943).
Ber. Deut. Chem. Gesell, vol. 55, page 3871 (1922).
Ber. Deut. Chem. Gesell, vol. 70, pages 567–568 (1937).